US008860668B2

(12) United States Patent
Choi et al.

(10) Patent No.: US 8,860,668 B2
(45) Date of Patent: Oct. 14, 2014

(54) DISPLAY DEVICE AND CONTROL METHOD THEREOF

(75) Inventors: Nam-gon Choi, Asan-si (KR); Seung-hwan Moon, Yongin-si (KR)

(73) Assignee: Samsung Display Co., Ltd. (KR)

( * ) Notice: Subject to any disclaimer, the term of this patent is extended or adjusted under 35 U.S.C. 154(b) by 1150 days.

(21) Appl. No.: 12/270,809

(22) Filed: Nov. 13, 2008

(65) Prior Publication Data
US 2009/0174650 A1 Jul. 9, 2009

(30) Foreign Application Priority Data
Jan. 7, 2008 (KR) .................. 10-2008-0001735

(51) Int. Cl.
*G06F 3/041* (2006.01)
*G06F 3/0488* (2013.01)

(52) U.S. Cl.
CPC ............ *G06F 3/0418* (2013.01); *G06F 3/0488* (2013.01)
USPC ........ 345/173; 178/18.06; 715/769; 715/835; 715/863

(58) Field of Classification Search
CPC ............ G06F 3/04883; G06F 3/04886; G06F 3/0486; G06F 3/0488; G06F 3/04817; G06F 2203/04808
USPC ................. 345/156, 173, 159, 163; 356/73.1; 715/702, 835, 863, 769; 178/18.06
See application file for complete search history.

(56) References Cited

U.S. PATENT DOCUMENTS

| | | | | |
|---|---|---|---|---|
| 5,880,411 A | * | 3/1999 | Gillespie et al. | 178/18.01 |
| 6,323,846 B1 | * | 11/2001 | Westerman et al. | 345/173 |
| 6,525,716 B1 | | 2/2003 | Makino | |
| 6,570,557 B1 | * | 5/2003 | Westerman et al. | 345/173 |
| 6,677,932 B1 | * | 1/2004 | Westerman | 345/173 |
| 6,943,779 B2 | * | 9/2005 | Satoh | 345/173 |
| 7,180,500 B2 | * | 2/2007 | Marvit et al. | 345/156 |
| 7,633,607 B2 | * | 12/2009 | Froggatt | 356/73.1 |
| 7,812,826 B2 | * | 10/2010 | Ording et al. | 345/173 |
| 7,877,707 B2 | * | 1/2011 | Westerman et al. | 715/863 |
| 8,441,453 B2 | | 5/2013 | Westerman et al. | |
| 2003/0076301 A1 | * | 4/2003 | Tsuk et al. | 345/159 |
| 2003/0076303 A1 | * | 4/2003 | Huppi | 345/163 |
| 2003/0095096 A1 | * | 5/2003 | Robbin et al. | 345/156 |
| 2005/0190149 A1 | | 9/2005 | Lee et al. | |
| 2006/0026521 A1 | * | 2/2006 | Hotelling et al. | 715/702 |

FOREIGN PATENT DOCUMENTS

| | | |
|---|---|---|
| JP | 06-168071 A | 6/1994 |
| JP | 8-6699 | 1/1996 |
| JP | 2001-236180 | 8/2001 |
| JP | 2001-265531 | 9/2001 |
| JP | 2002-501271 A | 1/2002 |

(Continued)

*Primary Examiner* — Michael J Eurice
(74) *Attorney, Agent, or Firm* — Innovation Counsel LLP

(57) ABSTRACT

A display device including a display panel, a sensing electrode that is disposed in a matrix pattern and outputs a sensing signal with respect to an external stimulus, a calculator that divides the display panel into a plurality of detection regions based on a coordinate of a first stimuli group outputting a sensing signal with respect to a first stimulus, and a position determiner is presented. The position determiner determines a coordinate of a second stimuli group outputting a sensing signal with respect to a second stimulus and designates the coordinate as a stimulus position if the second stimulus is generated from a selection detection region within predetermined detection time after the first stimulus.

15 Claims, 6 Drawing Sheets

(56) References Cited

FOREIGN PATENT DOCUMENTS

| | | |
|---|---|---|
| JP | 2003-223283 | 8/2003 |
| JP | 2004-078606 | 3/2004 |
| JP | 2004-252739 | 9/2004 |
| JP | 2005-129012 A | 5/2005 |
| JP | 2006-018569 | 1/2006 |
| JP | 2007-133610 | 5/2007 |
| JP | 2007-267388 A | 10/2007 |
| KR | 2002-0055516 | 7/2002 |
| KR | 2003-0060254 | 7/2003 |
| KR | 2004-0037247 | 5/2004 |
| KR | 2005-0096300 | 10/2005 |
| KR | 2006-0041576 | 5/2006 |
| KR | 2006-0046328 | 5/2006 |
| KR | 2007-0066810 | 6/2007 |

\* cited by examiner

DISPLAY DEVICE AND CONTROL METHOD THEREOF

CROSS-REFERENCE TO RELATED APPLICATION

This application claims priority to and benefit of Korean Patent Application No. 10-2008-0001735, filed on Jan. 7, 2008, in the Korean Intellectual Property Office, the disclosure of which is incorporated herein by reference.

BACKGROUND

1. Field of Invention

The present invention relates generally to a display device and a control method thereof, and more particularly, to a display device that includes a touch panel, and a control method thereof.

2. Description of the Related Art

Generally, a touch panel is disposed on a top of a display device so that a user can select directions displayed on a screen of a display panel such, as a liquid crystal display (LCD) panel, with his/her hand or with an object (e.g., a stylus). The display device including the touch panel has been increasingly used since it does not require an additional input device, such as a keyboard and/or a mouse. Meanwhile, an embedded touch panel, which is embedded in the display panel, has been developed. The embedded touch panel has a pressure sensor inside to detect external contact.

If a user's hand or a pointer touches the touch panel to generate a stimulus, an image signal is controlled according to the generated stimulus. If the stimulus is repeated temporally and spatially, the stimulus is not correctly detected. If a user contacts the touch panel with a part of his/her body, particularly with a finger from habit, the stimulus is not correctly detected.

SUMMARY

One or more embodiments of the present disclosure provide a display device that efficiently responds to a stimulus and improves a detection rate, and a control method thereof.

One or more embodiments of the present disclosure provide a display device that selects one of stimuli, if repetitive stimuli are generated, and a control method thereof.

The foregoing and/or other aspects of the present disclosure may be achieved by providing a display device, comprising: a display panel; a sensing electrode that is disposed in a matrix pattern and outputs a sensing signal upon receiving an external stimulus; a calculator that divides the display panel into a plurality of detection regions based on a coordinate of a first stimuli group outputting a sensing signal upon receiving a first stimulus; and a position determiner that determines a coordinate of a second stimuli group outputting a sensing signal upon receiving a second stimulus and designates the coordinate as a stimulus position if the second stimulus is generated from a selection detection region within predetermined detection time after the first stimulus.

According to an embodiment of the present disclosure, each of the first and second stimuli groups comprise at least one sensing electrode, and the calculator calculates a coordinate of the first stimuli group or the second stimuli group by using an average coordinate of the plurality of sensing electrodes outputting a sensing signal if the plurality of sensing electrodes outputs the sensing signal by the first stimulus or the second stimulus.

According to an embodiment of the present disclosure, the calculator divides the display panel into a first detection region including the coordinate of the first stimuli group, a second detection region having an inside boundary that coincides with the boundaries of the first detection region and an outside boundary including a rectangle larger than the first detection region, and a third detection region corresponding to the display panel except the first and second detection regions.

According to an embodiment of the present disclosure, the first detection region has a minimum point including a coordinate X formed by deducting a first difference value from a coordinate X of the first stimuli group and a coordinate Y formed by deducting a second difference value from a coordinate Y of the first stimuli group, and a maximum point including a coordinate X formed by adding a third difference value to the coordinate X of the first stimuli group and a coordinate Y formed by adding a fourth difference value to the coordinate Y of the first stimuli group, as diagonally positioned corners of a rectangular region.

According to an embodiment of the present disclosure, the external side of the second detection region has a minimum point including a coordinate X formed by deducting a fifth difference value larger than the first difference value from the coordinate X of the first stimuli group and a coordinate Y formed by deducting a sixth difference value larger than the second difference value from the coordinate Y of the first stimuli group, and a maximum point including a coordinate X formed by adding a seventh difference value larger than the third difference value to the coordinate X of the first stimuli group and a coordinate Y formed by adding an eighth difference value larger than the fourth difference value to the coordinate Y of the first stimuli group, as diagonally positioned corners of a rectangular region.

According to an embodiment of the present disclosure, the selection detection region corresponds to the second detection region.

According to an embodiment of the present disclosure, the position determiner outputs an error signal informing that a stimulus position is not detectable if a third stimulus is detected within the detection time after the first stimulus.

According to an embodiment of the present disclosure, the position determiner determines the number of sensing electrodes included in the second stimuli group and the number of sensing electrodes included in a third stimuli group corresponding to a third stimulus and determines a coordinate of a stimuli group having a larger number of sensing electrodes, as a stimulus position if the third stimulus is detected within the detection time after the first stimulus.

According to an embodiment of the present disclosure, the position determiner determines an average coordinate between the second stimuli group and the third stimuli group corresponding to the third stimulus, as a stimulus position if the third stimulus is detected within the detection time after the first stimulus.

According to an embodiment of the present disclosure, the display device further comprises a setting unit to set at least one of the detection time and the selection detection region.

According to an embodiment of the present disclosure, the display panel comprises a pixel substrate having a plurality of pixels, and the sensing electrode is formed on the pixel substrate.

According to an embodiment of the present disclosure, the display device further comprises a sensing line that is connected to the sensing electrode, wherein the sensing line is scanned according to a predetermined scan period to detect a stimulus, and wherein the detection time comprises from the generation of the first stimulus to a subsequent scan period consecutive to a scan period in which the first stimulus is detected.

According to an embodiment of the present disclosure, the position determiner determines an average coordinate between the first stimuli group and the second stimuli group, as a stimulus position, if the second stimulus is generated from the detection region instead of from the selection detection region.

According to an embodiment of the present disclosure, the position determiner outputs an error signal informing that the stimulus position is not detectable.

Another an embodiment of the present disclosure, a control method of a display device that has a display panel including a sensing electrode outputting a sensing signal with respect to an external stimulus, the control method comprising: calculating a coordinate of a first stimuli group outputting a sensing signal with respect to a first stimulus; dividing the display panel into a plurality of detection regions based on the coordinate of the first stimuli group; and calculating a coordinate of a second stimuli group outputting a sensing signal with respect to a second stimulus and determining the coordinate of the second stimuli group, as a stimulus position, if the second stimulus is generated from a selection detection region selected from a plurality of detection regions within predetermined detection time after the first stimulus.

BRIEF DESCRIPTION OF THE DRAWINGS

The above and/or other aspects of the present disclosure will become apparent and more readily appreciated from the following description of the exemplary embodiments, taken in conjunction with the accompanying drawings, in which.

DETAILED DESCRIPTION OF EXEMPLARY EMBODIMENTS

Figure 1:
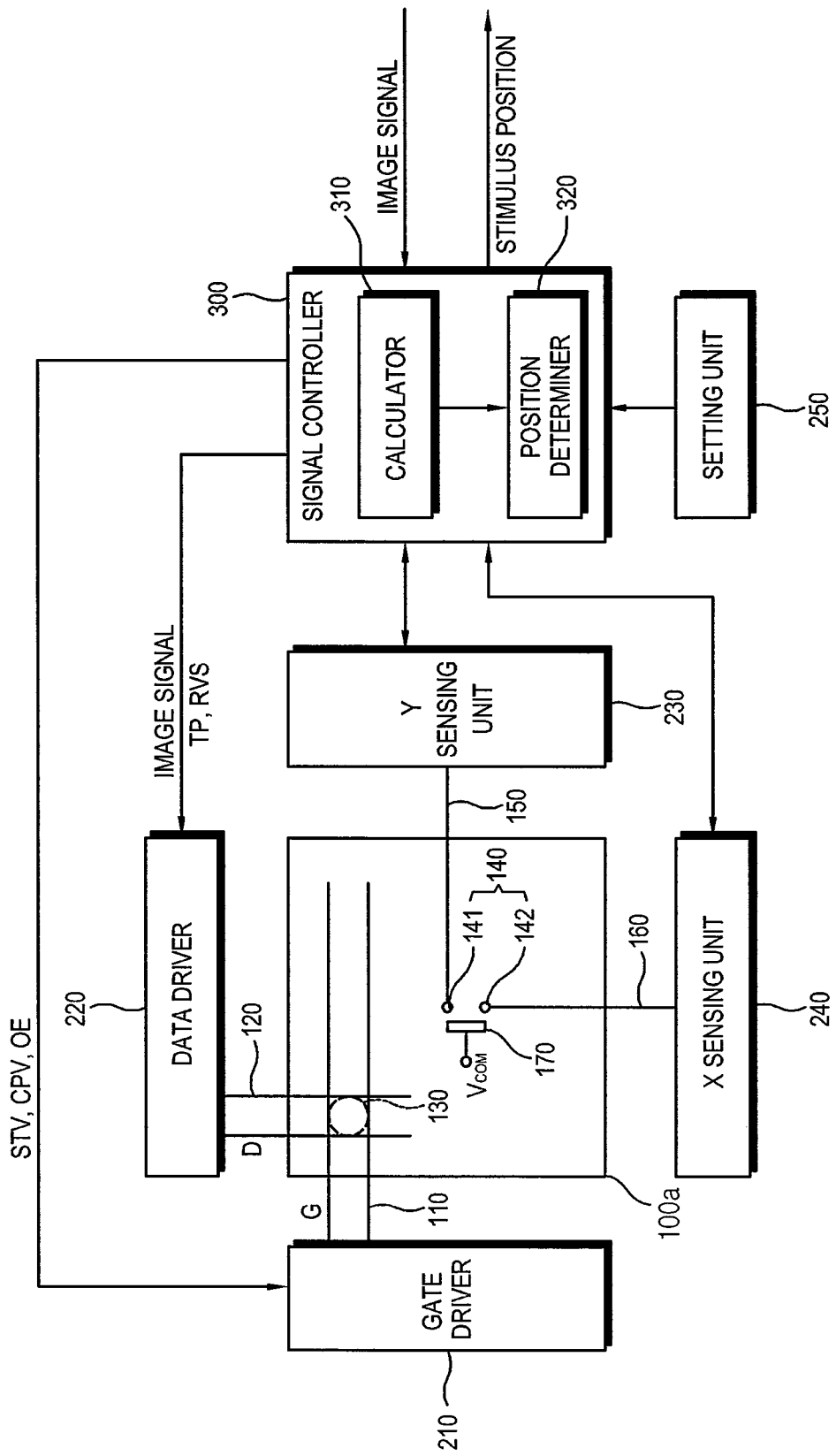
FIG. 1 is a control block diagram of a display device according to a first exemplary embodiment of the present disclosure.

Reference will now be made in detail to the embodiments of the present disclosure, examples of which are illustrated in the accompanying drawings, wherein like reference numerals refer to like elements throughout. The embodiments are described below so as to explain the present disclosure by referring to the figures.

FIG. 1 is a control block diagram of a display device according to a first exemplary embodiment of the present disclosure. As shown in FIG. 1, the display device includes a pixel substrate 100a, a plurality of drivers 210 and 220, a plurality of sensing units 230 and 240, a setting unit 250 and a signal controller 300 to control the foregoing elements.

The pixel substrate 100a may include a liquid crystal panel having an upper substrate on which a color filter layer is formed, or an organic light emitting panel having an organic light emitting layer on a pixel 130. In one implementation, the pixel substrate 100a is one element of a display panel 100 (e.g., refer to FIG. 2). A gate line 110, a data line 120 and a thin film transistor (not shown) are formed on the pixel substrate 100a. The gate line 110 extends in a first direction to form the pixel 130. The data line 120 insulatedly intersects the gate line 110 and defines the pixel 130. The thin film transistor is formed at an intersection between the gate line 110 and the data line 120.

In one embodiment, sensing electrodes 141 and 142 and a plurality of sensing lines 150 and 160 are formed on the pixel substrate 100a. The sensing electrodes 141 and 142 generate a predetermined electrical signal corresponding to an external stimulus. The plurality of sensing lines 150 and 160 is connected to the sensing electrodes 141 and 142. If the external stimulus is generated, a common voltage Vcom is transmitted from an upper surface of the pixel substrate 100a to the sensing electrodes 141 and 142. The transmitted electrical signal is outputted to the sensing units 230 and 240 through the sensing electrodes 141 and 142 and the sensing lines 150 and 160. The sensing electrodes 141 and 142 are uniformly disposed across the pixel substrate 100a. The sensing electrodes 141 and 142 include a Y sensing electrode 141 which informs Y position information about a stimulus-generated point, and an X sensing electrode 142 which informs X position information about the stimulus-generated point. The Y sensing electrode 141 is connected with the Y sensing line 150 while the X sensing electrode 142 is connected with the X sensing line 160. The Y sensing line 150 is in parallel with the gate line 110, and the X sensing line 160 is in parallel with the data line 120. The sensing electrodes 141 and 142 are formed by the same process as the thin film transistor. The sensing electrodes 141 and 142 may be provided in each of the pixels 130 or may be provided at predetermined intervals in the plurality of the pixels 130. Both the Y sensing electrode 141 and the X sensing electrode 142 may be included in a single pixel 130 or may be respectively provided in each pixels 130. The display device according to the present embodiment includes an embedded touch panel which has a sensing electrode as a detector detecting a stimulus in the display panel 100. However, the present disclosure which will be described later is not limited to the embedded touch panel, and may apply to a display device including an additional touch panel externally.

The gate driver 210 is referred to as a scan driver and applies a gate signal that combines a gate on voltage Von and a gate off voltage Voff, to the gate line 110. The data driver 220 is referred to as a source driver. The data driver 220 converts an image signal outputted by the signal controller 300 into an analog signal and supplies the analog signal to the pixels 130 through the data line 120.

The Y sensing unit 230 is connected with the Y sensing line 150 and the X sensing unit 240 is connected to the X sensing line 160 to convert a sensing signal inputted by the sensing lines 150 and 160 into a digital signal and to output the digital signal to the signal controller 300. The Y sensing unit 230 and the X sensing unit 240 include a switching element which sequentially scans the sensing lines 150 and 160 according to a scan signal inputted by the signal controller 300. The sensing lines 150 and 160 are sequentially scanned by the scan signal in a particular direction. The sensing signal generated by the stimulus is transmitted to the sensing units 230 and 240 through the scanned sensing lines 150 and 160. The sensing units 230 and 240 may include a driving chip such as the gate driver 210 and the data driver 220 to be connected to the pixel substrate 100a, or may be mounted in the gate driver 210 and the data driver 220.

The signal controller 300 includes a control block which is referred to as a timing controller. The signal controller 300 outputs various control signals to the gate driver 210, the data driver 220 and the sensing units 230 and 240. The signal controller 300 supplies an image signal inputted by an external source (not shown) to the display panel 100. The signal controller 300 determines a stimulus position with the sensing signal outputted by the sensing units 230 and 240 and outputs the stimulus position to the external source.

The signal controller 300 outputs a vertical synchronization start signal STV, a gate clock signal CPV controlling an output timing of a gate on signal and a gate on enable signal OE limiting a width of the gate on signal, to the gate driver 210. The signal controller 300 outputs a load signal LOAD or TP to apply a data signal to the data line 120 corresponding to an image signal, a reverse control signal RVS to reverse a polarity of a data signal and a horizontal clock signal and the like, to the data driver 220. The signal controller 300 outputs a sensing scan signal and a clock signal to the sensing units 230 and 240 to scan the sensing lines 150 and 160.

The signal controller 300 includes a calculator 310 and a position determiner 320 to output a stimulus position to the external source. The calculator 310 divides the display panel 100 into a plurality of detection regions I, II and III based on a coordinate of the sensing electrodes 141 and 142 outputting a sensing signal with respect to a first stimulus. When a second stimulus is generated after the first stimulus, the position determiner 320 determines a stimulus position and outputs the determined stimulus position to the external source. According to the present embodiment, if the display panel 100 receives a stimulus, the Y sensing electrode 141 and the X sensing electrode 142 generate a sensing signal. The position determiner 320 then determines the sensing lines 150 and 160 receiving the sensing signal, and recognizes a stimulus-generated position as a two-dimensional coordinate. For convenience, the position of the Y sensing electrode 141 and the X sensing electrode 142 which output the sensing signal with respect to the first stimulus is defined as a stimulus point hereinafter. According to the present embodiment, a stimulus position with respect to the first stimulus corresponds to a coordinate of a single, first stimulus point.

Figure 2:
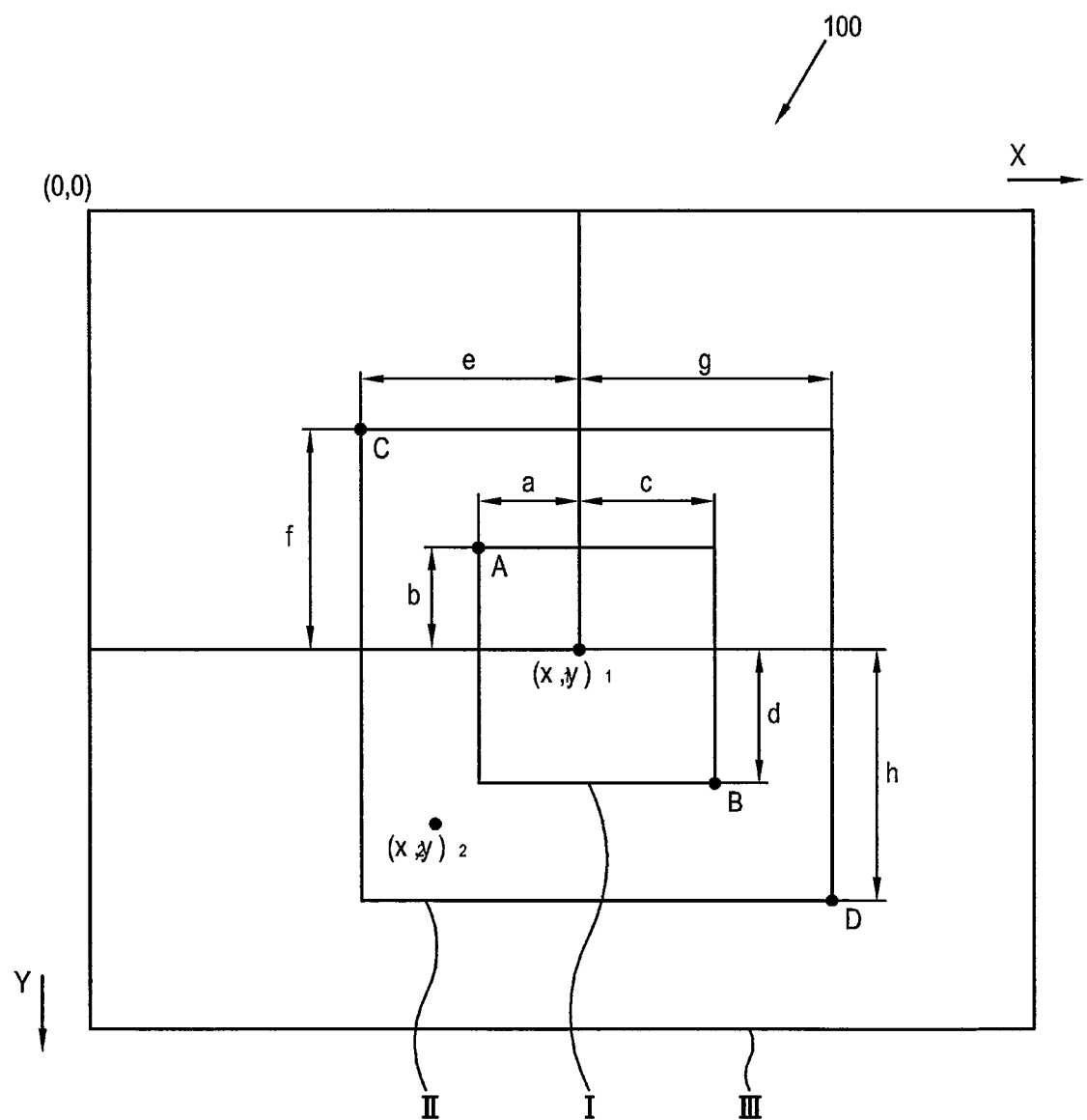
FIG. 2 illustrates a detection region of the display device according to the first exemplary embodiment of the present disclosure.

FIG. 2 illustrates the detection region I, II and III of the display device according to the present embodiment. As shown in FIG. 2, if the first stimulus is applied to the display panel 100, the calculator 310 divides the display panel 100 into a first detection region I, a second detection region II and a third detection region III based on a coordinate of the first stimulus point with respect to the first stimulus. As shown therein, the coordinate of the first stimulus point with respect to the first stimulus is (x1, y1). The display panel 100 is divided into the first detection region I shaped like a rectangle and including the coordinate of the first stimulus point, the second detection region II including an surrounding the first detection region I and having an outside boundary shaped like a rectangle larger than the first detection region I, and the third detection region III including regions outside the first and second detection regions I and II.

The first detection region I is a rectangle which has a first minimum point A and a first maximum point B. Points A and B are corners of the rectangle that are diagonally positioned from each other. The first minimum point A includes a coordinate X formed by deducting a first difference value a from the coordinate X (x1) of the first stimulus point and a coordinate Y formed by deducting a second difference value b from the coordinate Y (y1) of the first stimulus point. The first maximum point B includes a coordinate X formed by adding a third difference value c to the coordinate X (x1) of the first stimulus point and a coordinate Y formed by adding a fourth difference value d to the coordinate Y (y1) of the first stimulus point.

An internal side of the second detection region II corresponds to the first detection region I. An external side of the second detection region II includes a second minimum point C and a second maximum point D as vertexes facing each other. The second minimum point C includes a coordinate X formed by deducting a fifth difference value e from the coordinate X (x1) of the first stimulus point and a coordinate Y formed by deducting a sixth difference value f from the coordinate Y (y1) of the first stimulus point. The second maximum point D includes a coordinate X formed by adding a seventh difference value g to the coordinate X (x1) of the first stimulus point and a coordinate Y formed by adding an eighth difference value h to the coordinate Y (y1) of the first stimulus point.

Since the outside boundaries of the second detection region II define an area that is larger than its inside boundaries do, the fifth difference value e is larger than the first difference value a, the sixth difference value f is larger than the second difference value b, the seventh difference value g is larger than the third difference value c, and the eighth difference value h is larger than the fourth difference value d. The first to eighth difference values a to h are stored in the signal controller 300. If the coordinate of the first stimulus point is determined, the calculator 310 calculates the vertexes of the first and second detection regions I and II with the first to eighth difference values a to h.

If a second stimulus is generated from one of the plurality of detection regions I, II and III, i.e., from a selection detection region after the first stimulus, the position determiner 320 determines a coordinate of the second stimulus point instead of the first stimulus point, as a stimulus position. In this case, the position determiner 320 determines the coordinate of the second stimulus point as the stimulus position only when the second stimulus is generated within predetermined detection time after the first stimulus. As described above, the sensing units 230 and 240 scan the sensing lines 150 and 160 to detect the stimulus, and the sensing signal with respect to the stimulus is inputted to the sensing units 230 and 240 in every scan period of the sensing lines 150 and 160. If a plurality of stimuli is applied to the display panel 100, the stimuli are detected at constant intervals as long as the stimuli are not applied at the same time. Here, the shortest interval corresponds to a scan period. If a user applies stimuli to the display panel 100 at a very short interval (e.g., within a scan period), it is likely that the second to last stimuli represents the user's intent more than the first stimulus. In this case, not the first stimulus point but the second stimulus point is recognized as a control position that is actually desired by a user. The "selection detection region" is the region that is detected for stimulus after the first stimulus, and the second stimulus is a stimulus position. The selection detection region may be the size of a human hand, centering on the first stimulus point. The display device according to the present embodiment sets the second detection region II as the selection detection region, and determines the second stimulus point as the stimulus position if the second stimulus is generated from the second detection region II.

In one implementation, if the display panel 100 is divided into the plurality of detection regions I, II and III and the second stimulus is determined as the stimulus position, an actually-desired position of an image signal may be controlled with respect to the plurality of stimuli. That is, in one aspect, the stimulus, which is generated from the second detection region II after the first stimulus, is determined as the desired controlling part. The coordinate of the second stimulus point is determined as the stimulus position. Thus, the image signal may be controlled according to the desired stimulus, and an error generation ratio with respect to stimuli may be reduced. The second stimulus should be generated within predetermined detection time after the first stimulus, to thereby determine the second stimulus point disposed in the selection detection region, as the stimulus position.

According to the present embodiment, the range of the detection time may correspond to the scan period. For example, the second stimulus point is determined as the stimulus position only when the first stimulus is generated in a single scan period and when the second stimulus is generated in a subsequent scan period consecutive to the scan period where the first stimulus is detected. For example, it is assumed that the scan period is 3 ms long. If the first stimulus is generated in 3 ms and the second stimulus is generated in another 3 ms, i.e., a subsequent scan period, the second stimulus point is the stimulus position. The present disclosure may be applicable to the second stimulus which is generated in a maximum of 6 ms after the first stimulus.

If the second stimulus is generated within the scan period where the first stimulus is detected, the first and second stimuli are determinedly generated at the same time. If the second stimulus is generated out of the detection time, i.e., if the second stimulus is generated after a scan period subsequent to the scan period having the first stimulus, the second stimulus is determined as another first stimulus.

If the second stimulus is generated from the first detection region I or from the third detection region III instead of from the selection detection region, the display device may not determine the stimulus position and may output an error signal. Alternatively, the calculator 310 may calculate a coordinate corresponding to the middle of the first stimulus point corresponding to the first stimulus and the second stimulus point corresponding to the second stimulus to determine an average coordinate as the stimulus position.

The setting unit 250 corresponds to a user interface (UI) to set at least one of the detection time and the selection detection region. A user may set the detection time, i.e., the scanning time of the sensing lines 150 and 160 or set the first to eighth difference values a to h through the setting unit 250 according to his/her preferences. A user may change the selection detection region from the second detection region II to the first detection region I or to the third detection region III through the setting unit 250. The setting unit 250 may include a user input unit such as a remote controller, a keyboard, a mouse and the like; and a UI generator to display a graphic interface on the display panel 100. A user may change or set a method of detecting stimuli through the setting unit 250.

Figure 3:
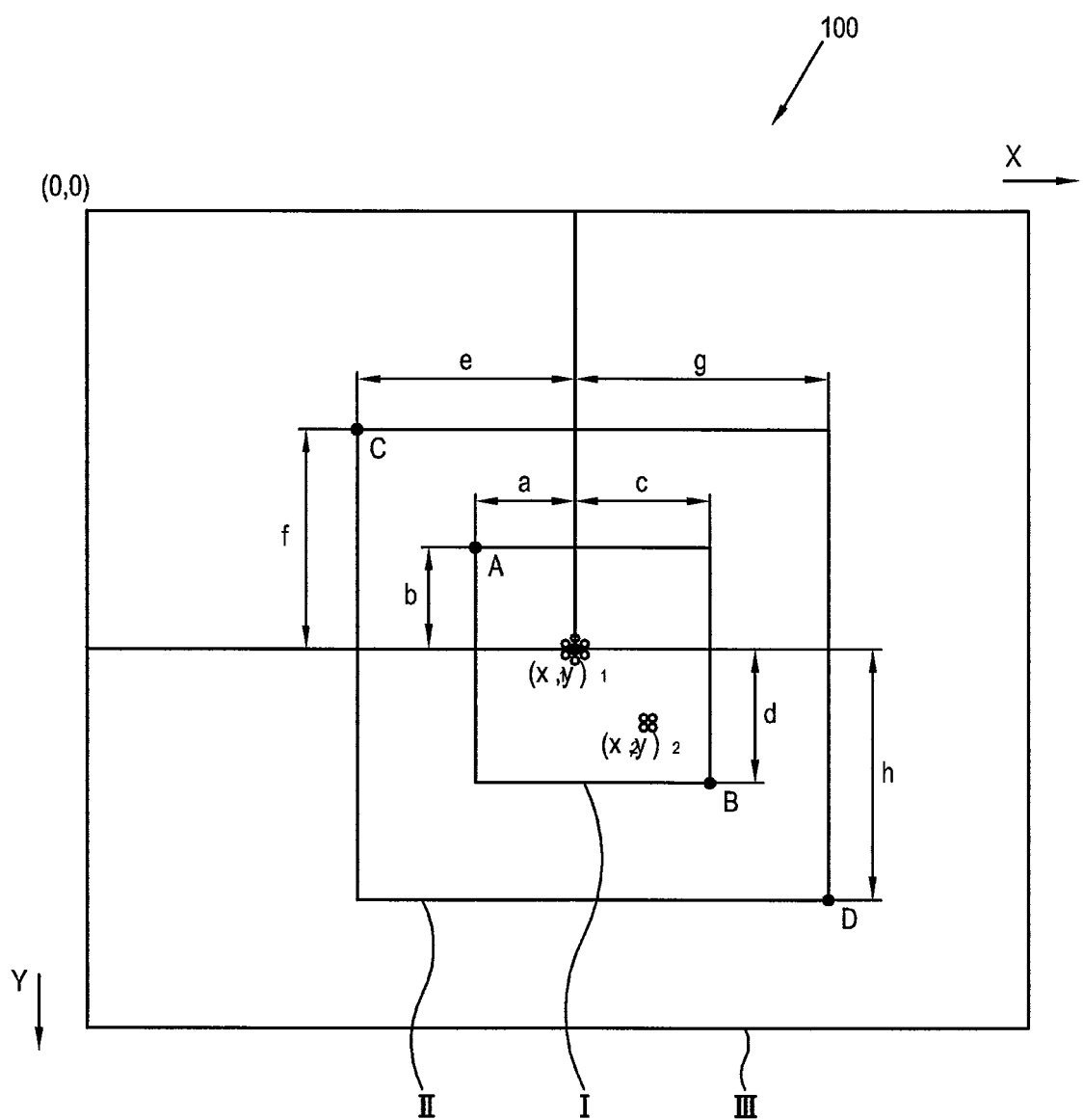
FIG. 3 illustrates a stimuli group of a display device according to a second exemplary embodiment of the present disclosure.

FIG. 3 illustrates a stimuli group of a display device according to a second exemplary embodiment of the present disclosure. As shown therein, a sensing signal is generated from a plurality of stimulus points by first and second stimuli. As sensing electrodes 141 and 142 are very densely formed, a size of a human finger or a point is large enough to stimulate the plurality of sensing electrodes 141 and 142.

In one implementation, the plurality of sensing electrodes 141 and 142 may respond to a single stimulus. Hereinafter, a group of adjacent sensing electrodes 141 and 142 outputting a sensing signal with respect to a stimulus is defined as a stimuli group. It is determined that a sensing signal is outputted at the same time from stimulus points included in a single stimuli group. A first stimuli group corresponding to the first stimulus includes seven stimulus points while a second stimuli group corresponding to the second stimulus includes four stimulus points. A calculator 310 calculates a single coordinate with respect to a stimulus position by using an average coordinate of the seven stimulus points included in the first stimuli group. The calculator 310 calculates a single coordinate by using an average of the four stimulus points included in the second stimuli group. If the sensing signal is outputted by the plurality of sensing electrodes 141 and 142, a method of calculating a coordinate of a representative single point may include various known methods. In one aspect, the calculator 310 performs the calculation with respect to first and second detection regions I and II based on the coordinate of the first stimuli group.

Figure 4:
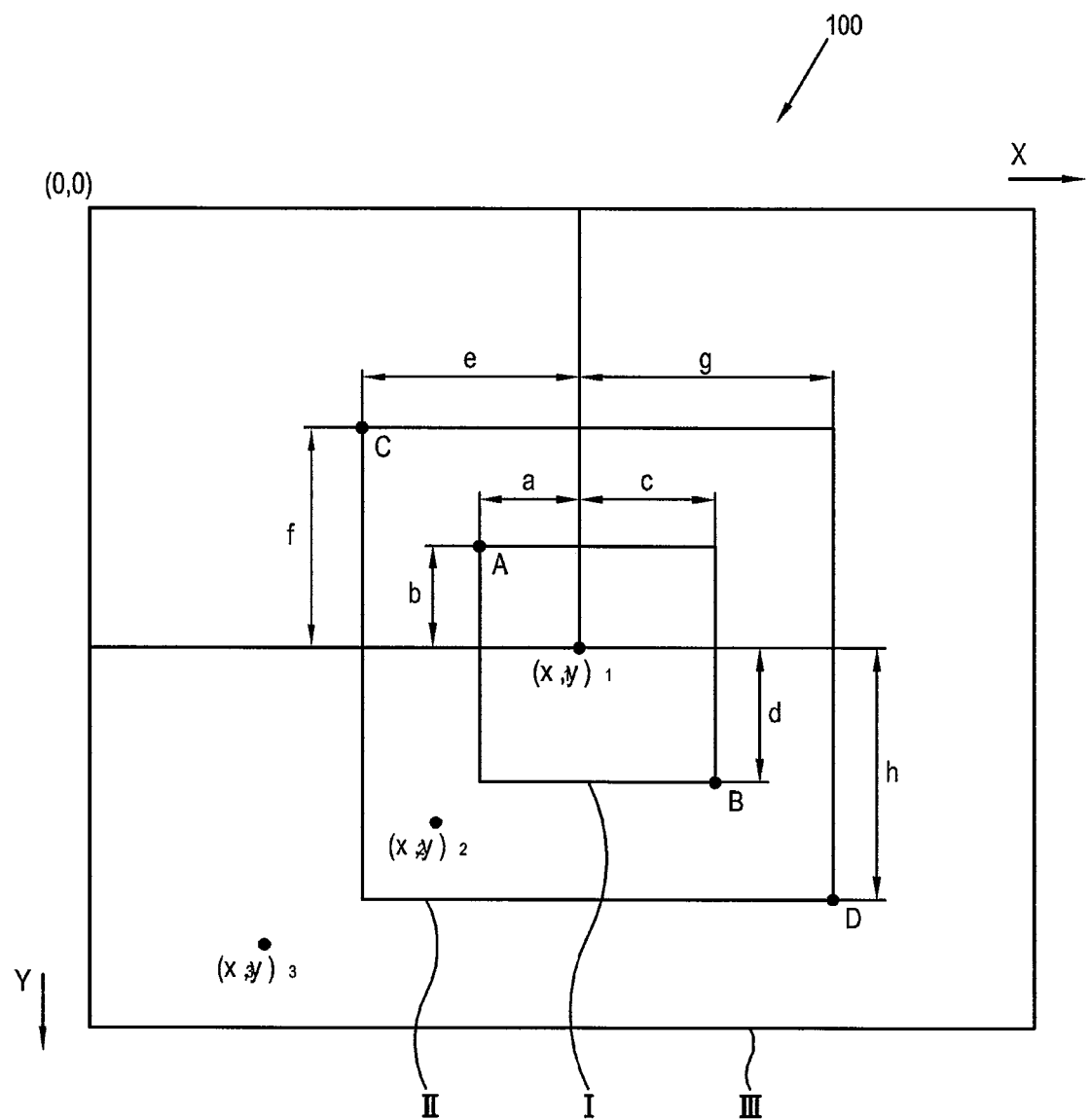
FIG. 4 illustrates a control method with respect to a third stimulus of a display device according to a third exemplary embodiment of the present disclosure.

FIG. 4 illustrates a control method of a third stimulus of a display device according to a third exemplary embodiment of the present disclosure. As shown in FIG. 4, if a third stimulus is generated consecutively to a second stimulus within detection time, the second and third stimuli are repetitive and a stimulus position is not determined. According to the present embodiment, regardless of which detection region the third stimulus is generated from, the display device generates and outputs an error signal to inform a user that the stimuli are repeated and the stimulus position is not correctly determined.

In one embodiment, the display device may include a speaker to output an audio signal as the error signal or include a light emitting diode flickering according to the error signal. The display device may include a user interface (UI) generator to display a window requesting an additional stimulus, on a display panel 100.

According to another exemplary embodiment, a calculator 310 may calculate a coordinate of a reference point between second and third stimulus points. A position determiner 320 may determine the reference point as the stimulus position.

According to another exemplary embodiment, a position determiner 320 may determine the number of stimulus points included in a second stimuli group and the number of stimulus points included in a third stimuli group to thereby determine a coordinate of the stimuli group having a larger number of stimulus points, as a stimulus position. The more strongly a user applies a stimulus, the greater is the number of stimulus points outputting a sensing signal. A user may set a control method through a setting unit 250 to realize the various exemplary embodiments.

Figure 5:
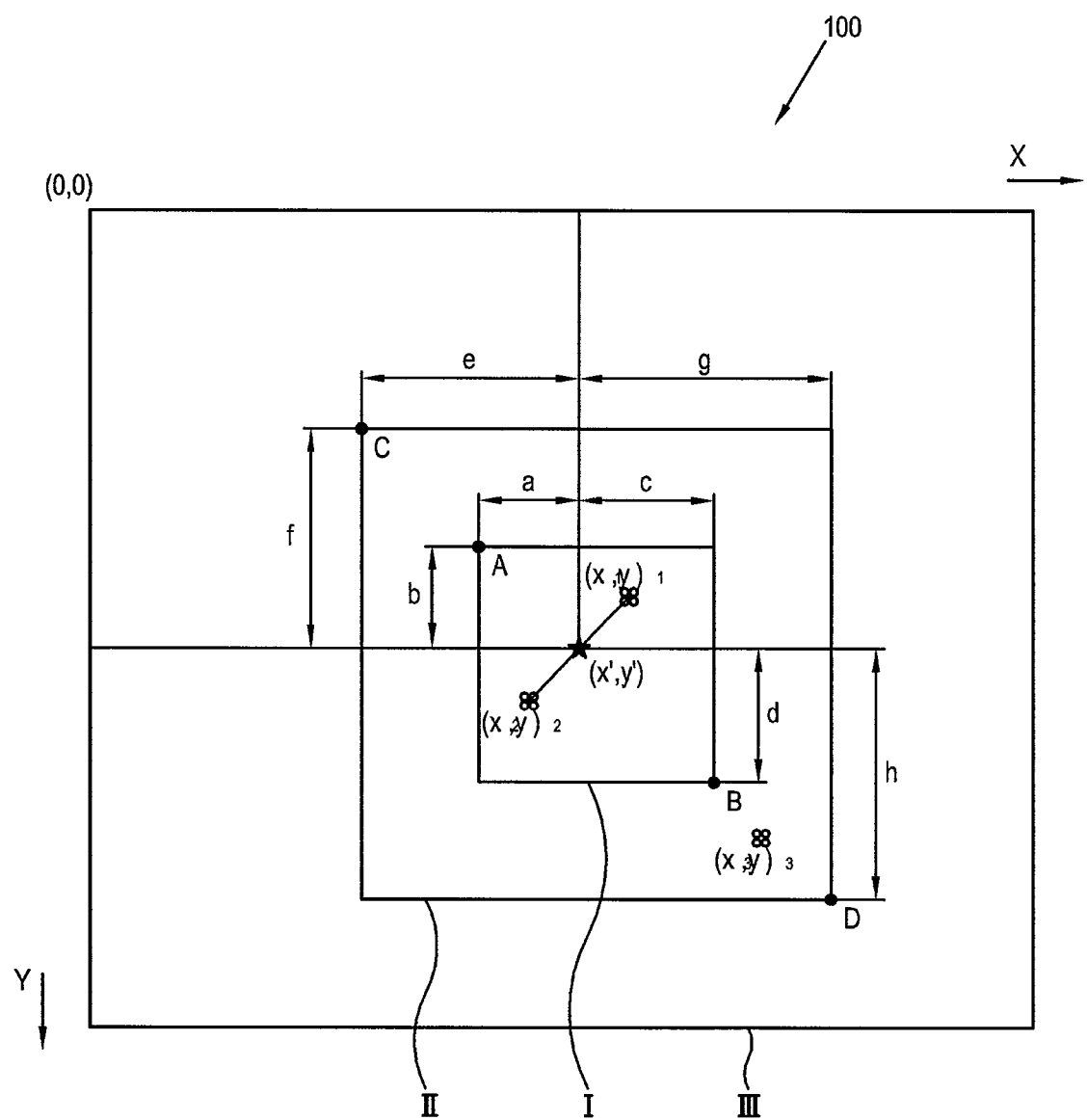
FIG. 5 illustrates a detection region of a display device according to a fourth exemplary embodiment of the present disclosure.

FIG. 5 illustrates a detection region of a display device according to a fourth exemplary embodiment of the present disclosure. According to the present embodiment, detection regions I, II and III are formed based on a reference point ☆ (x', y') of a first stimulus point and a second stimulus point. According to the present embodiment, the range of detection time is set to have two or three scan periods rather than single scan time. For example, if the first and second stimuli are generated all within approximately 6 ms, the detection regions I, II and III are set based on the reference point ☆ (x', y') of the first and second stimulus points instead of the first stimulus point. If a third stimulus is generated from a selection detection region, a position determiner 320 determines a third stimulus point (x3, y3) as a stimulus position. The present embodiment may be mainly applicable if a user brushes a display panel 100 with his/her fingers instead of stimulating a single point of the display panel 100.

In one implementation, if a plurality of stimuli is generated within a predetermined detection time, the detection regions I, II and III are set on the basis of the stimulus point (x', y') representing the plurality of stimulus points, and the third stimulus (x', y') which is generated thereafter from the selection detection region is determined as a stimulus position. The range of the detection time may be set or changed through a setting unit 250.

Figure 6:
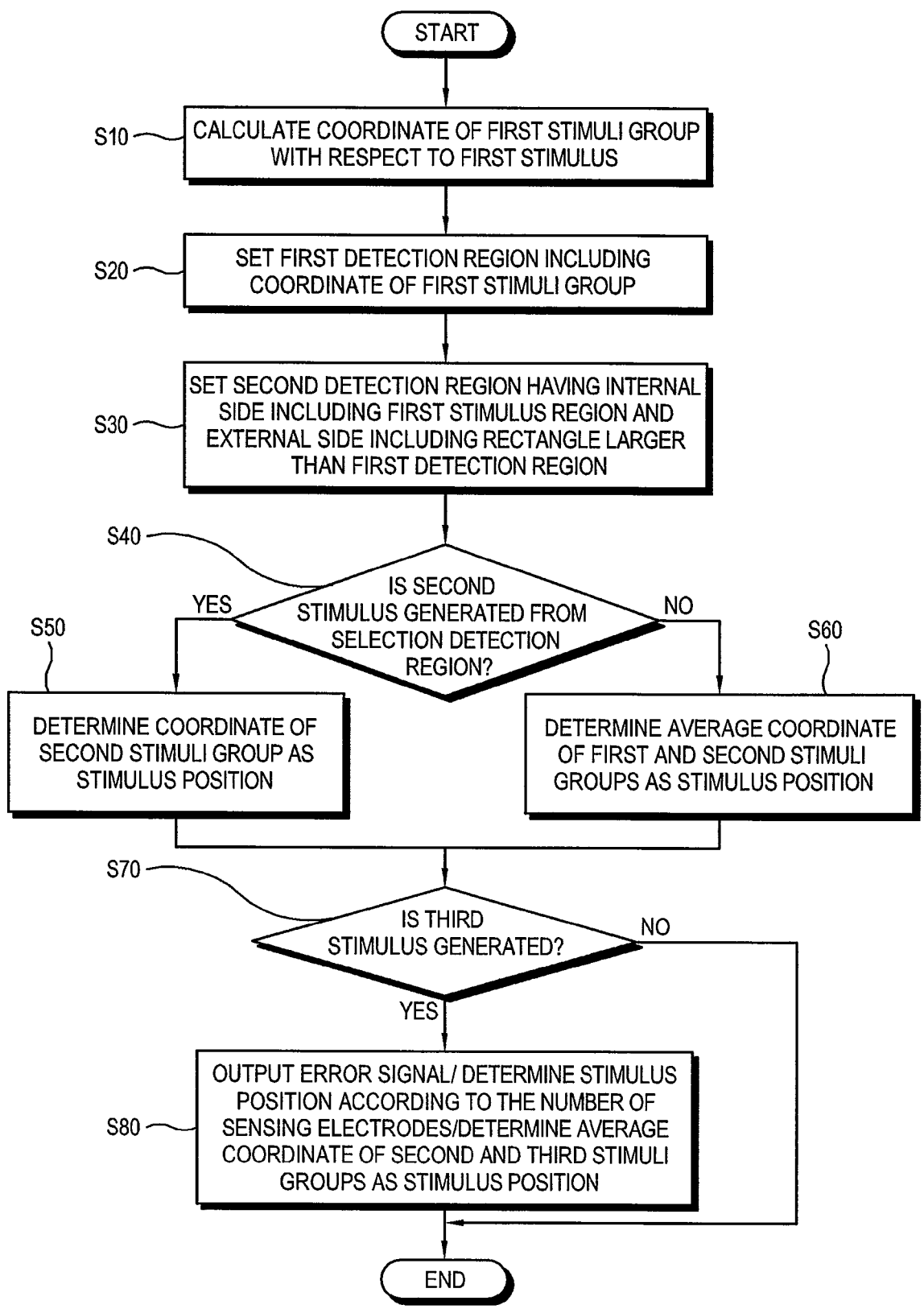
FIG. 6 illustrates a control method of the display device according to the present disclosure.

Referring to FIG. 6, a control method of the display device according to the present disclosure will be described. First, the coordinate of the first stimuli group outputting the sensing signal with respect to the first stimulus is calculated (S10). If the stimuli group includes a plurality of stimulus points, the calculator 310 calculates the coordinate of the first stimuli group with the average coordinates of the plurality of stimulus points. Then, the first detection region I is set on the basis of the coordinate of the first stimuli group (S20). The first detection region I is a rectangle which includes the first stimuli group.

The calculator 310 sets the second detection region II, whose inside boundaries coincide with the boundaries of the first detection region I and whose outside boundaries have the shape of a rectangle larger than the first detection region I (S30). If the second stimulus is generated within the detection time, it is determined whether the second stimulus is generated from the second detection region II as the selection detection region (S40).

If it is determined that the second stimulus is generated from the second detection region II, the coordinate of the second stimuli group is determined as the stimulus position (S50). If it is determined that the second stimulus is generated from other detection regions I and III, instead of from the selection detection region, the average coordinate of the first and second stimuli groups is determined as the stimulus position (S60). According to a user's setting, the error signal may be outputted if the second stimuli group is generated from the first detection region I, i.e., from the same detection region as the first stimuli group.

If the third stimulus is generated from the selection detection region (S70), the error signal is outputted, the stimulus position is determined according to the number of stimulus points of the stimuli group, i.e., by the number of the sensing electrodes or the average coordinate of the second and third stimuli groups is determined as the stimulus position. In one implementation, the control method of the third stimulus may vary according to user's preferences (S80).

As described above, the present disclosure provides a display device which responses to a stimulus efficiently and improves a detection rate, and a control method thereof. Also, the present disclosure provides a display device which selects one of stimuli if repetitive stimuli are generated, and a control method thereof.

Although a few exemplary embodiments of the present disclosure have been shown and described, it will be appreciated by those skilled in the art that changes may be made in these embodiments without departing from the scope of the disclosure, which is defined in the appended claims and their equivalents.

What is claimed is:

1. A display device comprising:
a display panel;
a sensing electrode that is disposed in a matrix pattern and outputs a sensing signal upon receiving an external stimulus;
a calculator that divides the display panel into a plurality of detection regions based on a coordinate of a first stimuli group determined from a sensing signal output by the sensing electrode upon receiving a first stimulus; and
a position determiner for determining a single touch position from multiple stimuli detected at different times, by determining a coordinate of a second stimuli group determined from a sensing signal output by the sensing electrode upon receiving a second stimulus, and by designating the coordinate of a second stimuli group as a stimulus position instead of the coordinate of a first stimuli group, only if the second stimulus is located in a selection detection region within a predetermined detection time after the first stimulus, the selection detection region being a predetermined one of the plurality of detection regions,
wherein the multiple stimuli are not detected simultaneously,
wherein the calculator divides the display panel into:
a first detection region including the coordinate of the first stimuli group,
a second detection region having an inside boundary that coincides with a boundary of the first detection region and an outside boundary including a rectangle larger than the first detection region, and
a third detection region corresponding to the display panel except for the first and second detection regions,
wherein the selection detection region corresponds to the second detection region,
wherein each of the first and second stimuli groups comprise at least one sensing electrode, and the calculator calculates a coordinate of the first stimuli group or the second stimuli group by using an average coordinate of the plurality of sensing electrodes outputting a sensing signal if the plurality of sensing electrodes outputs the sensing signal by the first stimulus or the second stimulus,
wherein the first detection region has a minimum point including a coordinate X formed by deducting a first difference value from a coordinate X of the first stimuli group and a coordinate Y formed by deducting a second difference value from a coordinate Y of the first stimuli group, and a maximum point including a coordinate X formed by adding a third difference value to the coordinate X of the first stimuli group and a coordinate Y formed by adding a fourth difference value to the coordinate Y of the first stimuli group, as diagonally positioned corners of a rectangular region, and
wherein the external side of the second detection region has a minimum point including a coordinate X formed by deducting a fifth difference value larger than the first difference value from the coordinate X of the first stimuli group and a coordinate Y formed by deducting a sixth difference value larger than the second difference value from the coordinate Y of the first stimuli group, and a maximum point including a coordinate X formed by adding a seventh difference value larger than the third difference value to the coordinate X of the first stimuli group and a coordinate Y formed by adding an eighth difference value larger than the fourth difference value to the coordinate Y of the first stimuli group, as diagonally positioned corners of a rectangular region.

2. The display device according to claim 1, wherein the position determiner outputs an error signal informing that a stimulus position is not detectable if a third stimulus is detected within the detection time after the first stimulus.

3. The display device according to claim 1, wherein the position determiner determines the number of sensing electrodes included in the second stimuli group and the number of sensing electrodes included in a third stimuli group corresponding to a third stimulus and determines a coordinate of a stimuli group having a larger number of sensing electrodes as a stimulus position if the third stimulus is detected within the detection time after the first stimulus.

4. The display device according to claim 1, wherein the position determiner determines an average coordinate between the second stimuli group and the third stimuli group corresponding to the third stimulus as a stimulus position if the third stimulus is detected within the detection time after the first stimulus.

5. The display device according to claim 1, further comprising a setting unit to set at least one of the detection time and the selection detection region.

6. The display device according to claim 1, wherein the display panel comprises a pixel substrate having a plurality of pixels, and
the sensing electrode is formed on the pixel substrate.

7. The display device according to claim 1, further comprising a sensing line that is connected to the sensing electrode, wherein the sensing line is scanned according to a predetermined scan period to detect a stimulus, and
wherein the detection time comprises from the generation of the first stimulus to a subsequent scan period consecutive to a scan period in which the first stimulus is detected.

8. The display device according to claim 1, wherein the position determiner determines an average coordinate between the first stimuli group and the second stimuli group, as a stimulus position, if the second stimulus is generated from the detection region instead of from the selection detection region.

9. The display device according to claim 8, wherein the position determiner outputs an error signal informing that the stimulus position is not detectable.

10. A method of controlling a display device that has a display panel including a sensing electrode outputting a sensing signal in response to an external stimulus, the method comprising:
determining a single touch position from multiple stimuli detected at different times, by:
calculating a coordinate of a first stimuli group determined from a sensing signal output by the sensing electrode in response to a first stimulus;
dividing the display panel into a plurality of detection regions based on the coordinate of a first stimuli group;
calculating a coordinate of a second stimuli group determined from a sensing signal output by the sensing electrode upon receiving a second stimulus;
designating the coordinate of the second stimuli group as a stimulus position instead of the coordinate of a first stimuli group, only if the second stimulus is located in a predetermined selection detection region selected from a plurality of the detection regions within a predetermined detection time after the first stimulus; and
determining an average coordinate between the second stimuli group and a third stimuli group corresponding to a third stimulus, as a stimulus position, if the third stimulus is further generated within the predetermined detection time after the first stimulus,
wherein the multiple stimuli are not detected simultaneously,
wherein the dividing the display panel into the plurality of detection regions further comprises setting a first detection region having the coordinate of the first stimuli group, and setting a second detection region that has an internal side along the first detection region and an external side of a rectangle larger than the first detection region,
wherein the selection detection region corresponds to the second detection region,
wherein the dividing the display panel into the plurality of detection regions comprises calculating a minimum point having a coordinate X formed by deducting a first difference value from a coordinate X of the first stimuli group and a coordinate Y formed by deducting a second difference value from a coordinate Y of the first stimuli group, and a maximum point having a coordinate X formed by adding a third difference value to the coordinate X of the first stimuli group and a coordinate Y formed by adding a fourth difference value to the coordinate Y of the first stimuli group to set the first detection region having the coordinate of the first stimuli group, and
wherein the external side of the second detection region has a minimum point including a coordinate X formed by deducting a fifth difference value larger than the first difference value from the coordinate X of the first stimuli group and a coordinate Y formed by deducting a sixth difference value larger than the second difference value from the coordinate Y of the first stimuli group and a maximum point including a coordinate X formed by adding a seventh difference value larger than the third difference value to the coordinate X of the first stimuli group and a coordinate Y formed by adding an eighth difference value larger than the fourth difference value to the coordinate Y of the first stimuli group, the minimum point and the maximum point forming diagonally positioned corners of a rectangular region.

11. The control method according to claim 10, further comprising outputting an error signal informing that a stimulus position is not detectable if a third stimulus is detected within the detection time after the first stimulus.

12. The control method according to claim 10, wherein a stimuli group comprises a plurality of sensing electrodes outputting a sensing signal, further comprising:
determining the number of sensing electrodes included in the second stimuli group and the number of sensing electrodes included in a third stimuli group corresponding to a third stimulus; and
determining a coordinate of a stimuli group having a larger number of sensing electrodes, as a stimulus position, if the third stimulus is further generated within the detection time after the first stimulus.

13. The control method according to claim 10, wherein the display panel further comprises a sensing line connected to the sensing electrodes, further comprising: scanning the sensing line according to a predetermined scan period to detect a stimulus, and the detection time comprises from the generation of the first stimulus to a subsequent scan period consecutive to a scan period in which the first stimulus is detected.

14. The control method according to claim 10, further comprising determining an average coordinate between the first stimuli group and the second stimuli group, as a stimulus position, if the second stimulus is generated from the detection region instead of from the selection detection region.

15. The control method according to claim 14, further comprising outputting an error signal informing that the stimulus position is not detectable.

* * * * *